US012093292B2

(12) United States Patent
Kawahara et al.

(10) Patent No.: US 12,093,292 B2
(45) Date of Patent: Sep. 17, 2024

(54) DOCUMENT RETRIEVAL DEVICE

(71) Applicant: Resonac Corporation, Tokyo (JP)

(72) Inventors: Yu Kawahara, Tokyo (JP); Takuya Minami, Tokyo (JP); Yu Okano, Tokyo (JP); Hiroko Takashi, Tokyo (JP); Yoshishige Okuno, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 18/245,061

(22) PCT Filed: Sep. 7, 2021

(86) PCT No.: PCT/JP2021/032807

§ 371 (c)(1),
(2) Date: Mar. 13, 2023

(87) PCT Pub. No.: WO2022/059556

PCT Pub. Date: Mar. 24, 2022

(65) Prior Publication Data

US 2023/0359653 A1 Nov. 9, 2023

(30) Foreign Application Priority Data

Sep. 16, 2020 (JP) ................................ 2020-155507

(51) Int. Cl.
*G06F 16/00* (2019.01)
*G06F 16/332* (2019.01)
*G06F 16/338* (2019.01)

(52) U.S. Cl.
CPC .......... *G06F 16/332* (2019.01); *G06F 16/338* (2019.01)

(58) Field of Classification Search
CPC ..... G06F 16/338; G06F 16/332; G06V 30/26; G06V 30/262
USPC .......................................................... 707/713
See application file for complete search history.

(56) References Cited

U.S. PATENT DOCUMENTS 5,842,159 A * 11/1998 Nakamura ............ G06F 40/253 704/4
6,023,536 A * 2/2000 Visser ................. G06V 30/262 382/229
2004/0255218 A1* 12/2004 Tada ....................... G06F 16/93 714/747
2008/0215550 A1* 9/2008 Fume ................. G06F 16/3322 707/999.102

FOREIGN PATENT DOCUMENTS

JP H07-152774 6/1995
JP 2007-048272 2/2007
JP 2007-323414 12/2007
JP 2020-047031 3/2020

* cited by examiner

*Primary Examiner* — Vincent F Boccio
(74) *Attorney, Agent, or Firm* — IPUSA, PLLC

(57) ABSTRACT

To improve accuracy in a document search for a document that includes a typographical error. A document retrieval device according to one embodiment of the present invention includes a misidentification table storing a correctly identified character string and a misidentified character string. The document retrieval device includes a document searcher. The document searcher obtains a search character string, and retrieves the search character string from both a document and a character string that is obtained by changing the misidentified character string included in the document to the correctly identified character string.

10 Claims, 15 Drawing Sheets

Figure 3:
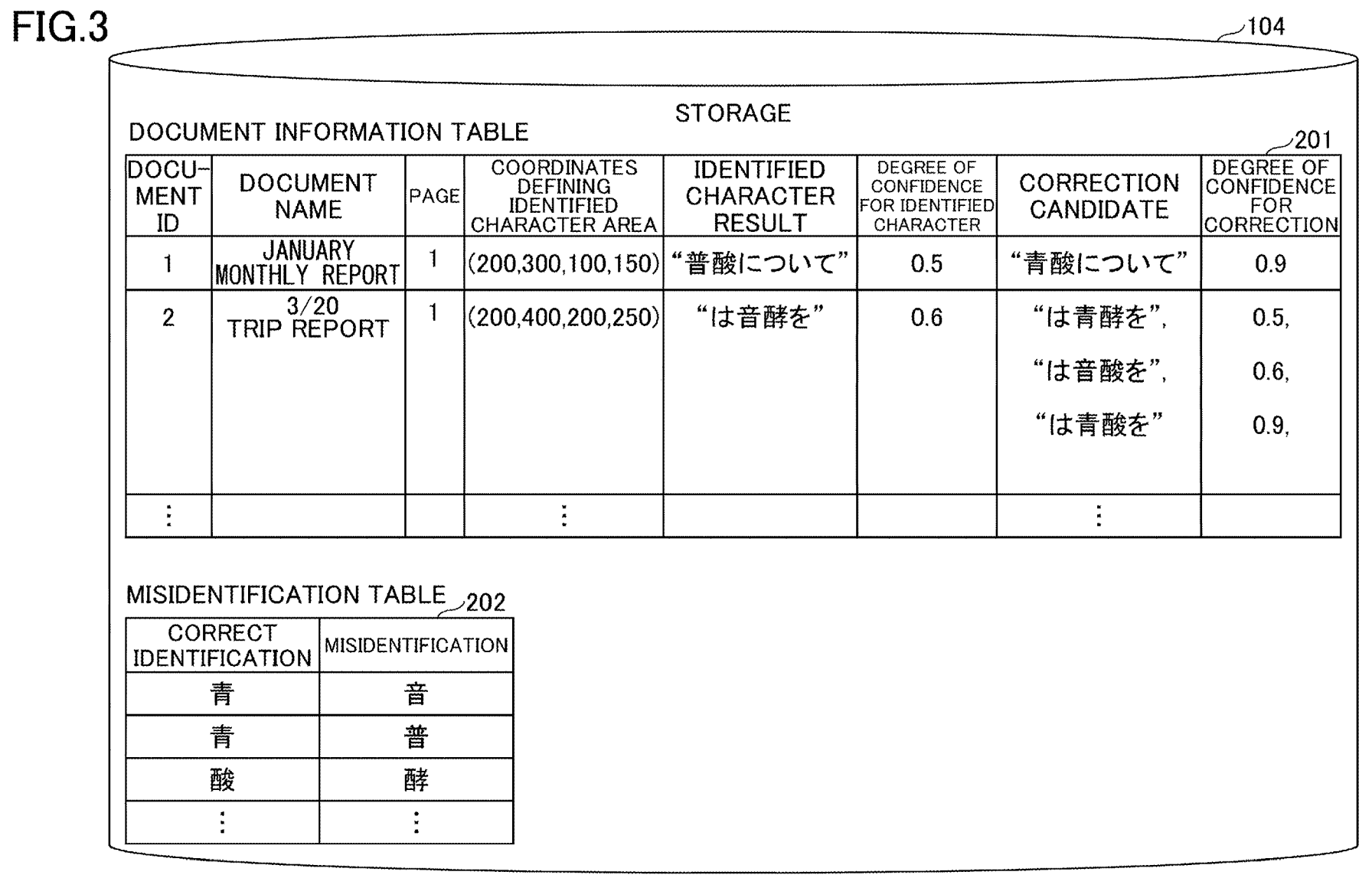

STORAGE

DOCUMENT INFORMATION TABLE

201

| DOCUMENT ID | DOCUMENT NAME | PAGE | COORDINATES DEFINING IDENTIFIED CHARACTER AREA | IDENTIFIED CHARACTER RESULT | DEGREE OF CONFIDENCE FOR IDENTIFIED CHARACTER | CORRECTION CANDIDATE | DEGREE OF CONFIDENCE FOR CORRECTION |
|---|---|---|---|---|---|---|---|
| 1 | JANUARY MONTHLY REPORT | 1 | (200,300,100,150) | “普酸について” | 0.5 | “青酸について” | 0.9 |
| 2 | 3/20 TRIP REPORT | 1 | (200,400,200,250) | “は音酵を” | 0.6 | “は青酵を”,<br>“は音酸を”,<br>“は青酸を” | 0.5,<br>0.6,<br>0.9, |
| ⋮ | | | ⋮ | | | ⋮ | |

MISIDENTIFICATION TABLE

202

| CORRECT IDENTIFICATION | MISIDENTIFICATION |
|---|---|
| 青 | 音 |
| 青 | 普 |
| 酸 | 酵 |
| ⋮ | ⋮ |

FIG.5

| CORRECT | INCORRECT |
| --- | --- |
| 厚生労働省 | 原生労働省 |
| 健康 | 健原 |
| ⋮ | ⋮ |

| # | IMAGE | IDENTIFIED CHARACTER RESULT | CORRECTED IDENTIFIED-CHARACTER RESULT | IDENTIFIED CHARACTER AND CORRECTED IDENTIFIED CHARACTER |
| --- | --- | --- | --- | --- |
| 1 | 厚生労働省だけでなく | 原生労働省だけでなく | 厚生労働省だけでなく | 原生労働省だけでなく<br>厚生労働省だけでなく |
| 2 | 原生生物は、真菌類なども | 原生生物は、真菌類なども | – | 原生生物は、真菌類なども |

SEARCH RESULT OBTAINED BEFORE CORRECTION

| # | 厚生労働省 | 原生生物 | 厚生 | 原生 |
| --- | --- | --- | --- | --- |
| 1 | × | – | × | – |
| 2 | – | HIT | – | HIT |

SEARCH RESULT OBTAINED IN THIS TECHNIQUE

| # | 厚生労働省 | 原生生物 | 厚生 | 原生 |
| --- | --- | --- | --- | --- |
| 1 | HIT | – | HIT | INCORRECT HIT |
| 2 | – | HIT | – | HIT |

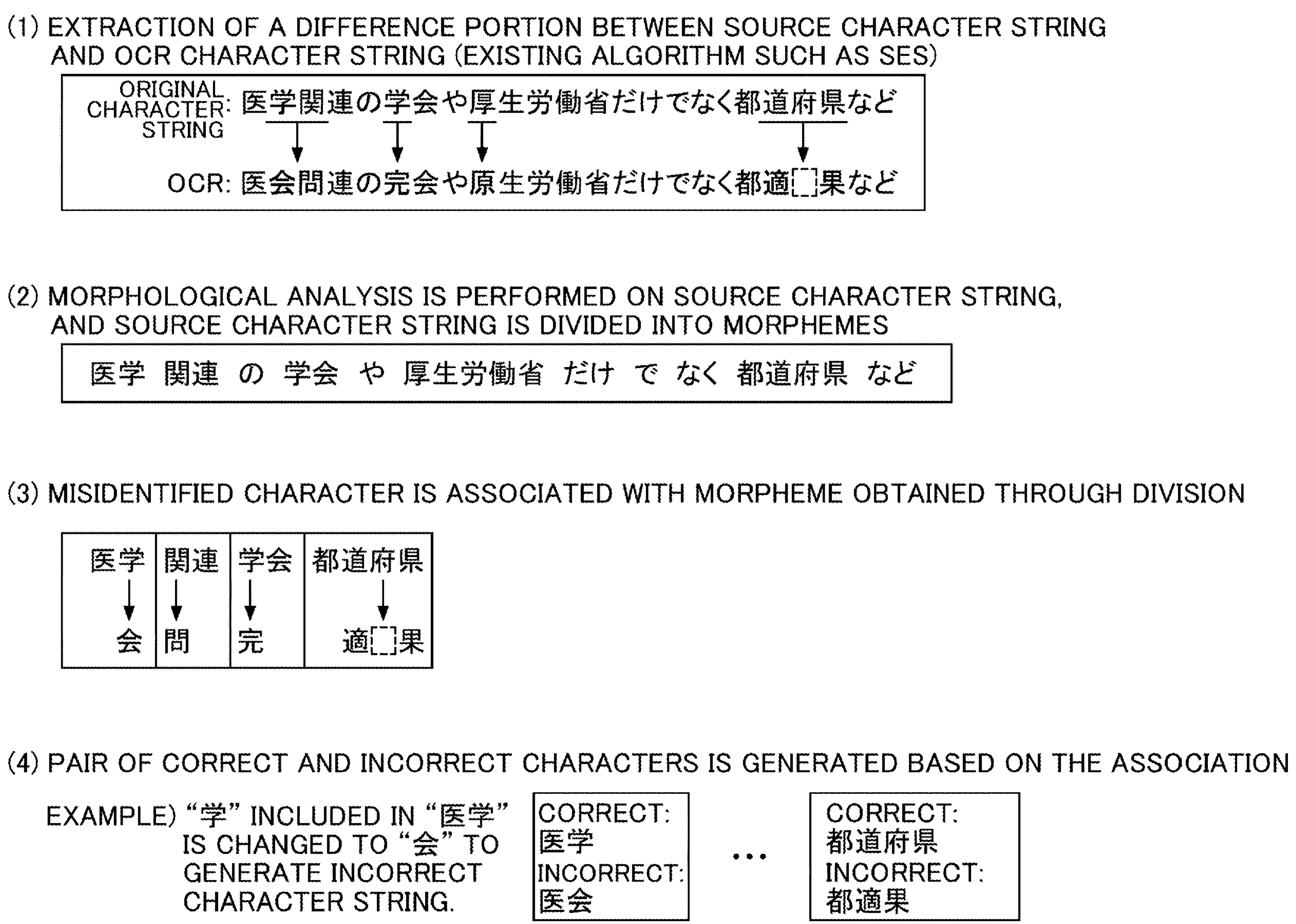

FIG.6

(1) EXTRACTION OF A DIFFERENCE PORTION BETWEEN SOURCE CHARACTER STRING AND OCR CHARACTER STRING (EXISTING ALGORITHM SUCH AS SES)

ORIGINAL CHARACTER: 医学関連の学会や厚生労働省だけでなく都道府県など
STRING
　　　　　　　↓　　　↓　　　　　　　　　　　↓
OCR: 医会関連の完会や原生労働省だけでなく都適□果など

(2) MORPHOLOGICAL ANALYSIS IS PERFORMED ON SOURCE CHARACTER STRING, AND SOURCE CHARACTER STRING IS DIVIDED INTO MORPHEMES

医学 関連 の 学会 や 厚生労働省 だけ で なく 都道府県 など

(3) MISIDENTIFIED CHARACTER IS ASSOCIATED WITH MORPHEME OBTAINED THROUGH DIVISION

| 医学 | 関連 | 学会 | 都道府県 |
|---|---|---|---|
| 会 | 間 | 完 | 適□果 |

(4) PAIR OF CORRECT AND INCORRECT CHARACTERS IS GENERATED BASED ON THE ASSOCIATION

CORRECT: 医学
INCORRECT: 医会

…

CORRECT: 都道府県
INCORRECT: 都適果

EXAMPLE) "学" INCLUDED IN "医学" IS CHANGED TO "会" TO GENERATE INCORRECT CHARACTER STRING.

FIG.7

| # | IMAGE | IDENTIFIED CHARACTER RESULT (DEGREE OF CONFIDENCE FOR IDENTIFIED CHARACTER) | CORRECTED IDENTIFIED-CHARACTER RESULT (DEGREE OF CONFIDENCE FOR CORRECTION) | EXCLUSION OF IDENTIFIED CHARACTER RESULT OR CORRECTED IDENTIFIED CHARACTER RESULT THAT HAS A LOW DEGREE OF CONFIDENCE IN SEARCH (DEGREE OF CONFIDENCE FOR CORRECTION) |
|---|---|---|---|---|
| 1 | 厚生労働省だけでなく | 原生労働省だけでなく (0.5) | 厚生労働省だけでなく (0.8)<br>康生労働省だけでなく (0.3) | ~~原生労働省だけでなく(0.5)~~<br>厚生労働省だけでなく(0.8)<br>~~康生労働省だけでなく(0.3)~~ |
| 2 | )原生生物は、真菌類なども、 | 原生生物は、真菌類なども (0.9) | 康生生物は、真菌類なども (0.6) | 原生生物は、真菌類なども(0.9)<br>~~康生生物は、真菌類なども(0.6)~~ |

| CORRECT | INCORRECT |
|---|---|
| 厚生労働省 | 原生労働省 |
| 康 | 原 |

SEARCH RESULT OBTAINED BEFORE CORRECTION

| # | 厚生労働省 | 原生生物 | 厚生 | 原生 |
|---|---|---|---|---|
| 1 | × | – | × | – |
| 2 | – | HIT | – | HIT |

SEARCH RESULT OBTAINED IN THIS TECHNIQUE

| # | 厚生労働省 | 原生生物 | 厚生 | 原生 |
|---|---|---|---|---|
| 1 | HIT | – | HIT | – |
| 2 | – | HIT | – | HIT |

FIG.8

■OCR CHARACTER STRING (0)日本の指事業法にあっては塩化ナトリウムの含有量が100分の4以上の回形物

| # | CORRECT | INCORRECT |
|---|---|---|
| 1 | 塩事業法 | 指事業法 |
| 2 | 固形物 | 回形物 |
| 3 | 10g | 10 |

■OCR CHARACTER STRING IS CORRECTED USING PAIR OF CORRECT AND INCORRECT CHARACTERS, AND CORRECTION CANDIDATE IS GENERATED (1)日本の塩事業法にあっては塩化ナトリウムの含有量が100分の4以上の回形物

(2)日本の指事業法にあっては塩化ナトリウムの含有量が100分の4以上の固形物

(3)日本の指事業法にあっては塩化ナトリウムの含有量が10g0分の4以上の回形物

☆MORPHOLOGICAL ANALYSIS IS PERFORMED ON OCR CHARACTER STRING (0)日本|の|指|事業法|に|あっ|て|は|塩化ナトリウム|の|含有量|が|100分|の|4|以上|の|回|形|物 → 22 MORPHEMES (1)日本|の|塩事業法|に|あっ|て|は|塩化ナトリウム|の|含有量|が|100分|の|4|以上|の|回|形|物 → 21 MORPHEMES (2)日本|の|指|事業法|に|あっ|て|は|塩化ナトリウム|の|含有量|が|100分|の|4|以上|の|固形物 → 21 MORPHEMES (3)日本|の|指|事業法|に|あっ|て|は|塩化ナトリウム|の|含有量|が|10g|0分|の|4|以上|の|回|形|物 → 23 MORPHEMES

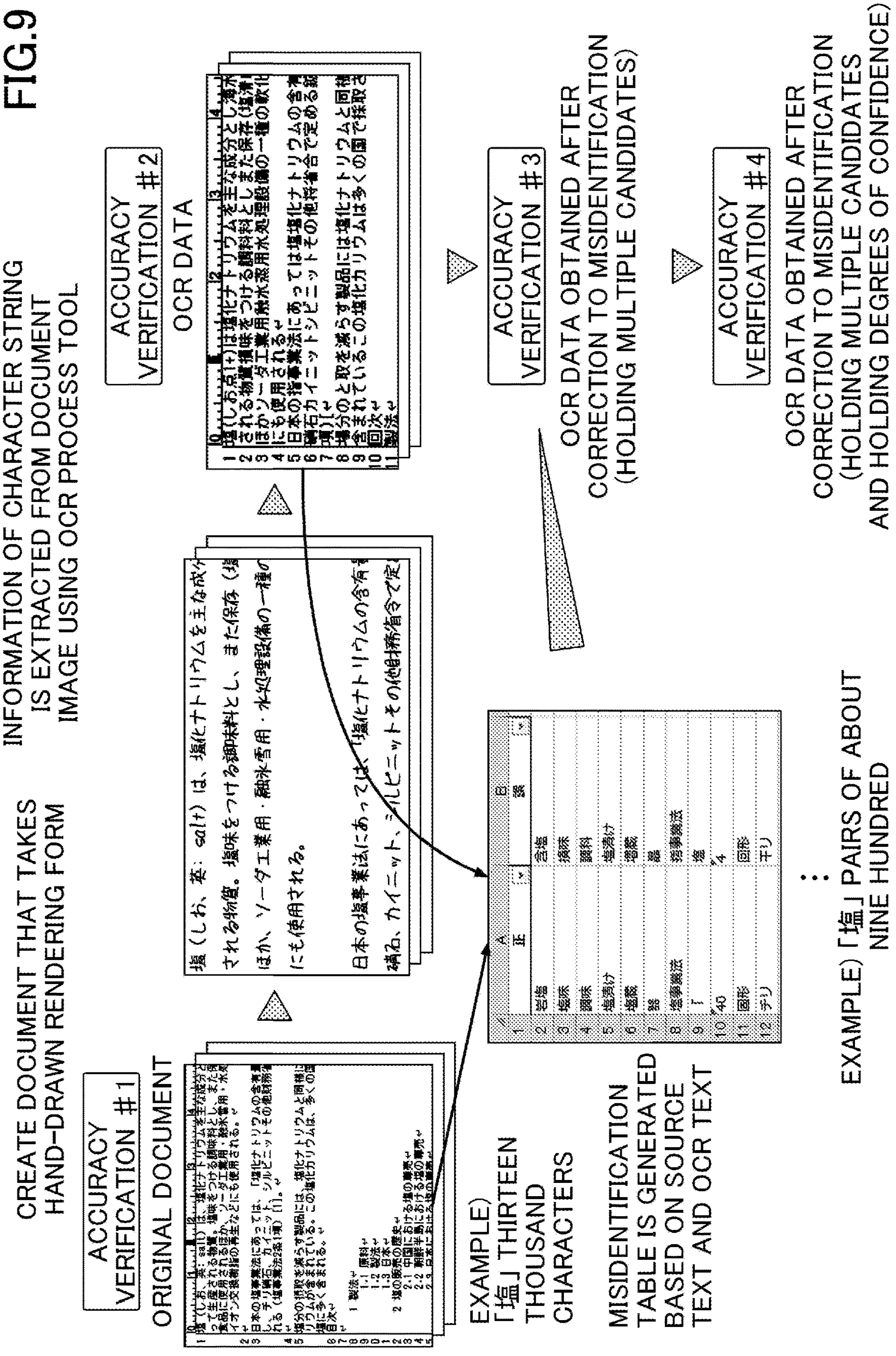

FIG.9

ACCURACY VERIFICATION #1
ORIGINAL DOCUMENT

CREATE DOCUMENT THAT TAKES HAND-DRAWN RENDERING FORM

INFORMATION OF CHARACTER STRING IS EXTRACTED FROM DOCUMENT IMAGE USING OCR PROCESS TOOL

ACCURACY VERIFICATION #2
OCR DATA

ACCURACY VERIFICATION #3
OCR DATA OBTAINED AFTER CORRECTION TO MISIDENTIFICATION (HOLDING MULTIPLE CANDIDATES)

ACCURACY VERIFICATION #4
OCR DATA OBTAINED AFTER CORRECTION TO MISIDENTIFICATION (HOLDING MULTIPLE CANDIDATES AND HOLDING DEGREES OF CONFIDENCE)

EXAMPLE) 「塩」THIRTEEN THOUSAND CHARACTERS

MISIDENTIFICATION TABLE IS GENERATED BASED ON SOURCE TEXT AND OCR TEXT

EXAMPLE) 「塩」PAIRS OF ABOUT NINE HUNDRED

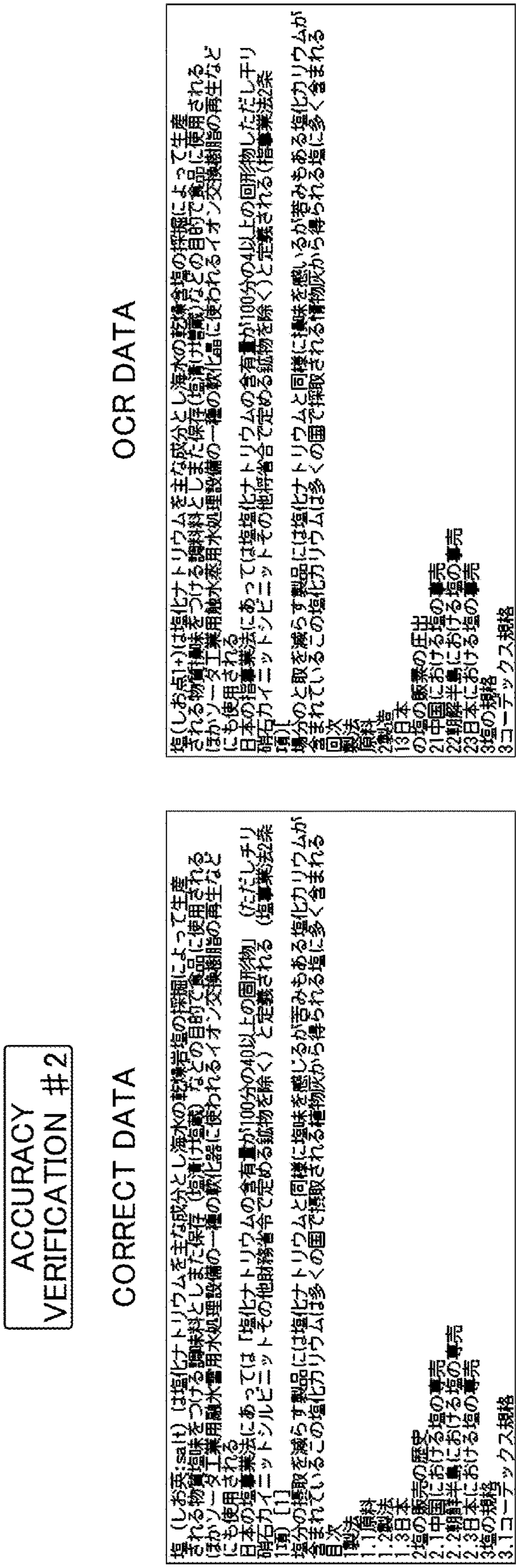

FIG.10

ACCURACY VERIFICATION #2

CORRECT DATA

塩（しお英:salt）は塩化ナトリウムを主な成分とし海水の乾燥岩塩の採掘によって生産される物質。食に塩味をつける調味料として、または保存（塩漬け食品）などの目的で食品に使用されるほか、ソーダ工業用耐水塩用耐水処理設備の一部の飲料機器に使われるイオン交換樹脂の再生などにも使用される
「塩化ナトリウムその他化合物を除く」と定義される鉱物由来の回形物品だしにがり、岩石カイーンルビーットトリウムビニットその他の化合物を除く）と定義される（塩事業法2条
1項）
目次
1.1 原料
2.製法
1.3 日本
2 塩の販売の歴史
2.1 中国における塩の専売
2.2 朝鮮半島における塩の専売
2.3 日本における塩の専売
3 塩の規格
3.1 コーデックス規格

OCR DATA

項」
目次
製法
1.3 日本
2.1 中国における塩の専売
2.2 朝鮮半島における塩の専売
2.3 日本における塩の専売
3 塩の規格

ACCURACY VERIFICATION #4

OCR DATA OBTAINED AFTER CORRECTIONS OF MISIDENTIFICATIONS
(HOLDING MULTIPLE CANDIDATES AND HOLDING DEGREES OF CONFIDENCE)

OCR DATA LINE: ～含塩＃＃0.214

CORRECTION OF MISIDENTIFICATION:
- ～岩塩＃＃0.285
- ～含「＃＃0.145 ×

HOLD A VALUE OF DEGREE OF CONFIDENCE THAT HAS A DEGREE OF CONFIDENCE FOR CORRECTION

FIG.13

| | #1 SOURCE DOCUMENT | #2 OCR DATA | #3 OCR DATA OBTAINED AFTER CORRECTIONS OF MISIDENTIFICATIONS (HOLDING MULTIPLE CANDIDATES) | #4 OCR DATA OBTAINED AFTER CORRECTIONS OF MISIDENTIFICATIONS (HOLDING MULTIPLE CANDIDATES AND HOLDING DEGREES OF CONFIDENCE) |
|---|---|---|---|---|
| Precision | 1.00 | 0.91 | 0.905 | 0.913 |
| Recall | 1.00 | 0.73 | 0.907 | 0.904 |
| F1 | 1.00 | 0.81 | 0.906 | 0.908 |

※FOR MISIDENTIFICATION TABLE, ALL SETS, THAT IS,
900 PAIRS IN MISIDENTIFICATION TABLE ARE NOT USED,
AND 800 PAIRS ARE USED EXCEPT FOR INCORRECT ONE CHARACTER

| # | CORRECT | INCORRECT | |
|---|---|---|---|
| 1 | 塩事業法 | 指事業法 | ○ |
| 2 | 9 | の | × |

DOCUMENT RETRIEVAL DEVICE

TECHNICAL FIELD

This application claims priority to Patent Application No. 2020-155507, filed Sep. 16, 2020 with the Japan Patent Office, the contents of which are incorporated herein by reference in their entirety.

The present invention relates to a document retrieval device, a document retrieval system, a document retrieval program, and a method for document searching.

BACKGROUND ART

Conventional document searches have been known in which documents are searched by keywords that are designated by users. In the document searches, an approach referred to as an exact-match search is known to extract a character string that exactly matches a keyword. In the exact-match search, if a document includes a typographical error, any document that is intended by a user may be irretrievable (also referred to as search omission), or a search result (also referred to as search noise) that is not what the user has desired may get generated. In such a situation, there is a known search approach to replace a character that is assumed to be the typographical error with a correct character, based on a preliminarily prepared errata (for example, Patent Document 1).

CITATION LIST

Patent Document

[Patent Document 1] Japanese Unexamined Patent Application Publication No. 2007-323414

SUMMARY

Problems to be Solved by the Invention

However, by replacing characters based on the errata, any correct character may be changed to an incorrect character. In other words, a situation arises where a string that could have been extracted provided that characters therein were not replaced based on the errata cannot get extracted could not be extracted.

Therefore, an object of the present invention is to improve accuracy in a document search for a document that includes a typographical error.

Means for Solving the Problem

[1] A document retrieval device includes:

a misidentification table storing a correctly identified character string and a misidentified character string; and a document searcher configured to obtain a search character string, and retrieve the search character string from both a document and a character string that is obtained by changing the misidentified character string included in the document to the correctly

[2] The document retrieval device according to [1], wherein each of the correctly identified character string and the misidentified character string is a character string that consists of one character.

[3] The document retrieval device according to [1], wherein each of the correctly identified character string and the misidentified character string is a morpheme that consists of a plurality of characters.

[4]The document retrieval device according to [1], wherein misidentification tables, each of which includes a pair of the correctly identified character string and the misidentified character string, are each set in situations including both a case where each of the correctly identified character string and the misidentified character string is a character string that consists of one character and a case where each of the correctly identified character string and the misidentified character string is a morpheme that consists of a plurality of characters.

[5] The document retrieval device according to any one of [1] to [4] further includes a document information table that stores:

a degree of confidence for the character string that is obtained by changing the misidentified character string included in the document to the correctly identified character string, and a degree of confidence for a character string that is used before changing the misidentified character string included in the document to the correctly identified character string, wherein the document searcher is configured to exclude a corresponding character string having a low degree of confidence, from a search target.

[6] The document retrieval device according to any one of [1] to [4] further includes a document information table that stores:

a degree of confidence for the character string that is obtained by changing the misidentified character string included in the document to the correctly identified character string, and a degree of confidence for a character string that is used before changing the misidentified character string included in the document to the correctly identified character string, wherein the document searcher is configured to lower a priority for a corresponding character string having a low degree of confidence.

[7] The document retrieval device according to any one of [1] to [6], wherein the document searcher includes a search result display, and wherein the search result display is configured to display a search result.

[8] A document retrieval system includes:

a document retrieval device, and a user terminal, wherein the document retrieval device includes:

a misidentification table storing a correctly identified character string and a misidentified character string, and a document searcher configured to obtain a search character string, and retrieve the search character string from both a document and a character string that is obtained by changing the misidentified character string included in the document to the correctly

[9] A document retrieval program causes a computer with a misidentification table that stores a correctly identified character string and a misidentified character string to serve as a document searcher, the document searcher being configured to obtain a search character string; and retrieve the search character string from both a document and a character string that is obtained by changing the misidentified character string included in the document to the correctly identified character string.

[10] A method is executed by a document retrieval device with a misidentification table that stores a correctly identified character string and a misidentified character string, the method including:

obtaining a search character string; and retrieving the search character string from both a document and a character string that is obtained by changing the misidentified character string included in the document to the correctly identified character string.

Effect of the Invention

According to the present invention, accuracy in a document search for a document that includes a typographical error can be improved.

BRIEF DESCRIPTION OF DRAWINGS

FIG. 3 is a diagram illustrating an example of data that is stored in a storage of the document retrieval device according to one embodiment of the present invention.

FIG. 5 is a diagram for describing the document search (second embodiment) according to one embodiment of the present invention.

FIG. 6 is a diagram for describing a method example of creating a misidentification table according to one embodiment of the present invention.

FIG. 7 is a diagram for describing the document search (third embodiment) according to one embodiment of the present invention.

FIG. 8 is a diagram for describing an example of a relative degree of confidence according to one embodiment of the present invention.

FIG. 9 is a diagram for describing accuracy verification according to one embodiment of the present invention.

FIG. 10 is a diagram for describing the accuracy verification according to one embodiment of the present invention.

FIG. 13 is a diagram for comparing accuracy verifications according to one embodiment of the present invention.

DESCRIPTION OF EMBODIMENTS

One or more embodiments will be described below with reference to the accompanying drawings. In the specification and the drawings, constituent elements that have substantially the same functional configuration are denoted by the same numerals, and redundant description thereof are omitted.

<Description of Terms>

The present invention can be applied to a document search in which any one or more documents are retrieved. In the specification, a case of using a document into which an image of a printed or handwritten document is converted by optical character recognition (OCR) is described below. However, the present invention can be applied to the document search in which any document, such as a document that is created using document creation software, is retrieved. A "document" may include any typographical error.

<System Configuration>

Figure 1:
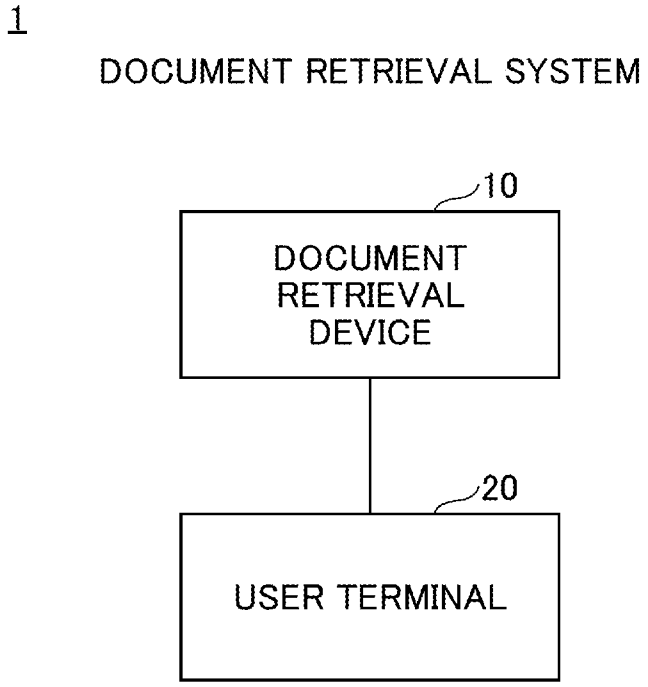
FIG. 1 is a diagram illustrating the overall configuration of a system that includes a document retrieval device according to one embodiment of the present invention.

FIG. 1 is a diagram illustrating the overall configuration of a system that includes a document retrieval device 10 according to one embodiment of the present invention. As illustrated in FIG. 1, a document retrieval system 1 includes the document retrieval device 10 and a user terminal 20. The document retrieval device 10 can transmit and receive data to and from the user terminal 20 via any network. These are described below.

The document retrieval device 10 is a device (for example, a server) that performs a document search process. The document retrieval device 10 will be described below in detail with reference to FIG. 2.

The user terminal 20 is a terminal that a user uses when searching a document. For example, the user terminal 20 is a personal computer or the like.

The document retrieval device 10 may have a portion or all of the functions of the user terminal 20.

<Functional Blocks of Document Retrieval Device 10>

Figure 2:
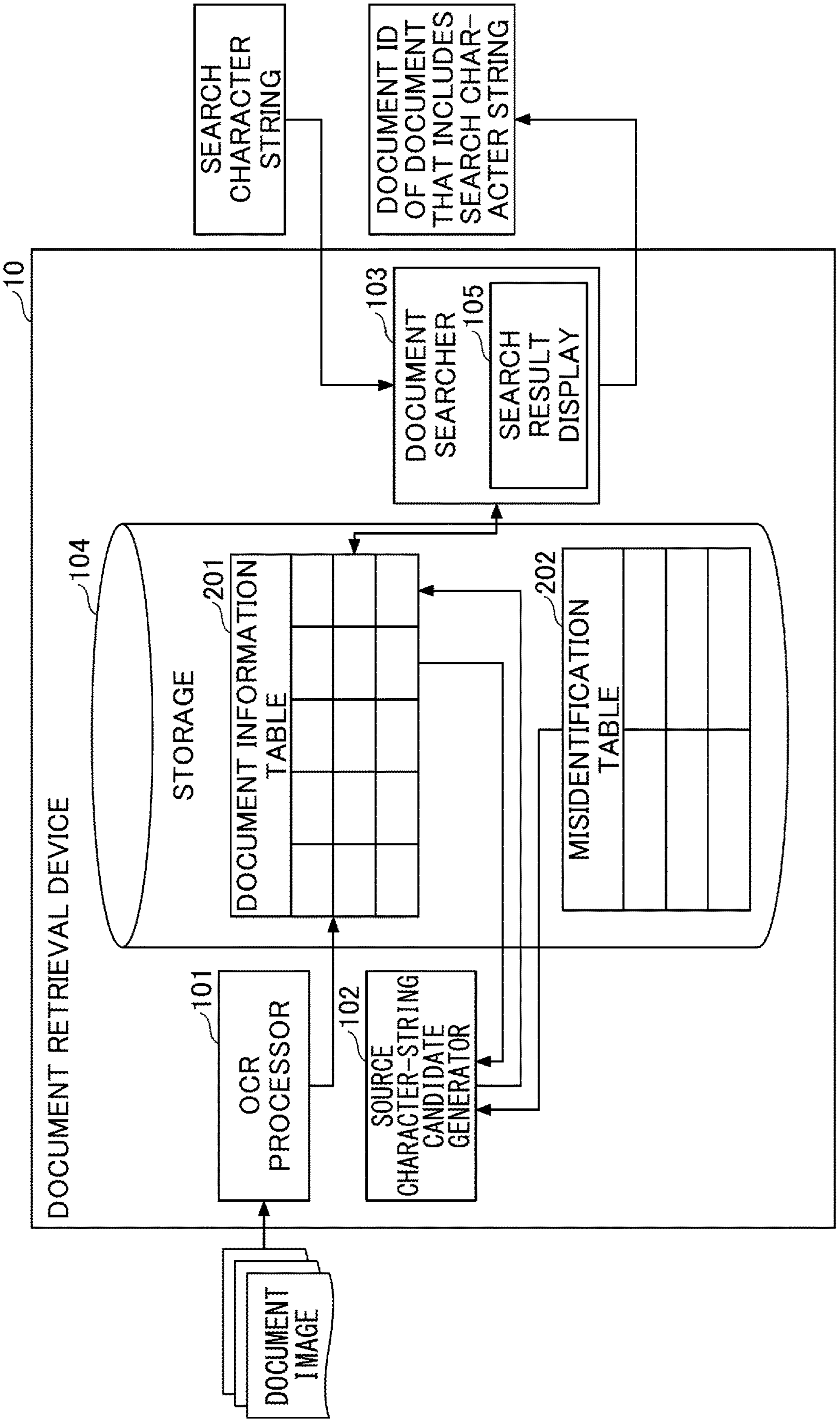
FIG. 2 is a diagram illustrating functional blocks of the document retrieval device according to one embodiment of the present invention.

FIG. 2 is a diagram illustrating the functional blocks of the document retrieval device 10 according to one embodiment of the present invention. As illustrated in FIG. 2, the document retrieval device 10 includes a misidentification table 202 and a document searcher 103. The misidentification table will be described later. The document retrieval device 10 can further include an optical character recognition (OCR) processor 101, a source character-string candidate generator 102, and a storage 104. The document searcher 103 can further include a search result display 105. The storage 104 can include a document information table 201 and the misidentification table 202. The document retrieval device 10 with the misidentification table serves as the document searcher 103 by executing any program. The document retrieval device 10 with the misidentification table can further serve as the OCR processor 101, the source character-string candidate generator 102, and the search result display 105 by executing any program. These are described below.

The OCR processor 101 extracts information (hereinafter also referred to as character string information) of a character string. Specifically, the OCR processor 101 acquires a document image (for example, an image of a handwritten document). The OCR processor 101 performs optical character recognition (OCR) processing to extract information of a character string from the acquired document image. In a case of the document that is created by document creation software, information of one or more character strings in the document is used.

The source character-string candidate generator 102 generates a source-character string candidate (for example, a candidate for a character string that is assumed to be present in a handwritten source document), by using the misidentification table 202. Specifically, the source character-string candidate generator 102 refers to strings associated with a "correct identification" and a "misidentification" in the misidentification table 202 to change, to a character string associated with the "correct identification", a character string associated with "incorrect identification" that is included in character string information (or character string information in a document in a case where the document is created using document creation software) that the OCR processor 101 extracts, and then generates a corresponding source character-string candidate.

The document searcher 103 performs a document search process. Specifically, the document searcher 103 acquires a character string to be searched in a document (hereinafter also referred to as a search character string) from the user terminal 20. Further, the document searcher 103 searches a search character string, from both character string information (or character string information in a document in a case where the document is created using document creation software) extracted by the OCR processor 101 and, a source character-string candidate generated by the source character-string candidate generator 102.

A search result display 105 included in the document searcher 103 can display a result of document searching that the document searcher 103 performs. The result (for example, a document ID of a given document that includes the search character string, a handwritten document image corresponding to the given document that includes the search character string, or the like) of the searching is output to the user terminal 20.

Specifically, the search result display 105 can display an identified character result and a corrected character result that are used in the search, although these items are described later. The search result display 105 can further display a degree of confidence, for a given identified character, and a degree of confidence, for correction, which are used in the search. In addition, the search result display 105 can display, for a document image, a predetermined area that is defined by coordinates of identified characters that correspond to a given search character string.

The storage 104 stores a document information table 201 and the misidentification table 202. The storage 104 is described below in detail with reference to FIG. 3.

FIG. 3 illustrates an example of data that is stored in the storage 104 of the document retrieval device according to one embodiment of the present invention. As illustrated in FIG. 3, the storage 104 stores the document information table 201 and the misidentification table 202. These are described below.

<Document Information Table>

The document information table 201 stores, for each document, data of a "document ID", a "document name", a "page", "coordinates defining identified character area", an "identified character result", a "degree of confidence for identified character", a "correction candidate", and a "degree of confidence for correction."

The "document ID" is an identifier specifying a given document.

The "document name" is a name of a given document.

When a given document contains a plurality of pages, the "page" is information for specifying a given page where the "identified character result" is present in the given document.

The "coordinates defining identified character area" are coordinates indicating an area in which the "identified character result" is present.

The "identified character result" indicates character string information that the OCR processor 101 extracts from a document image. In a case of the document that is created using document creation software, the character string information in the document is used.

The "degree of confidence for identified character" is an extent to which the "identified character result" is accurate. Details will be described below with reference to FIG. 8.

The "correction candidate" is a source character-string candidate that the source character-string candidate generator 102 generates. One or more correction candidates are stored.

The "degree of confidence for correction" is an extent to which the "correction candidate" is accurate. Details will be described below with reference to FIG. 8.

<Misidentification Table>

The misidentification table 202 stores data of one or more pairs of the "correct identification" and the "misidentification." As described above, the source character-string candidate generator 102 changes, to a character string associated with the "correct identification", a character string associated with the "misidentification" that is included in character string information (or character string information in a document in a case where the document is created using document creation software) that is extracted by the OCR processor 101, and then generates a source character-string candidate (that is, "correction candidate" in the document information table 201 in FIG. 3).

The "misidentification" is a character string that is assumed to be incorrect, among character strings in the document.

The "correct identification" is a character string corresponding to a character string that is stored in the "misidentification". Specifically, the "correct identification" is a correct character string that is obtained by correcting a character string that is stored in the "misidentification."

Each of a character string associated with the "correct identification" and a character string associated with the "misidentification" may be a character string that consists of one character, or may be a character string (for example, a morpheme) that consists of multiple characters.

The misidentification table 202 may be formed for each document. Alternatively, a single misidentification table 202 for all documents that are stored in the document information table 201 may be formed. In addition, the misidentification table 202 may be formed for each set of a plurality of similar documents such as a case where a common technical field is related, or may be formed for each specific character string that includes a plurality of morphemes and includes any technical term.

Each of a corrected identified character string and a misidentified character string that are included in the wrong conversion table 202 may be a character string that consists of one character, or may be a morpheme that consists of a plurality of characters. In both a case where each of a corrected identified character string and a misidentified character string consists of one character and a case where each of a corrected identified character string and a misidentified character string is a morpheme that consists of a plurality of characters, respective misidentification tables 202 may be formed.

When the OCR processor 101 performs OCR processing with respect to an acquired handwritten document image, the number of characters may be erroneously identified. For example, when a left-side kanji radical and a right-side kanji radical are written apart from each other, "坪" may be erroneously identified as two characters of "土" and "平." In the other case, when two handwritten characters are close to each other, "山鳥" may be erroneously identified, for example, as one character "嶋." Even in such misidentification cases, the above characters may be stored in the misidentification table 202 as data of a pair of the "misidentification" and the "correct identification."

Hereinafter, a first embodiment of the document search will be described with reference to FIG. 4, a second embodiment of the document search will be described with reference to FIGS. 5 and 6, and a third embodiment of the document search will be described with reference to FIGS. 7 and 8.

<First Embodiment>

Figure 4:
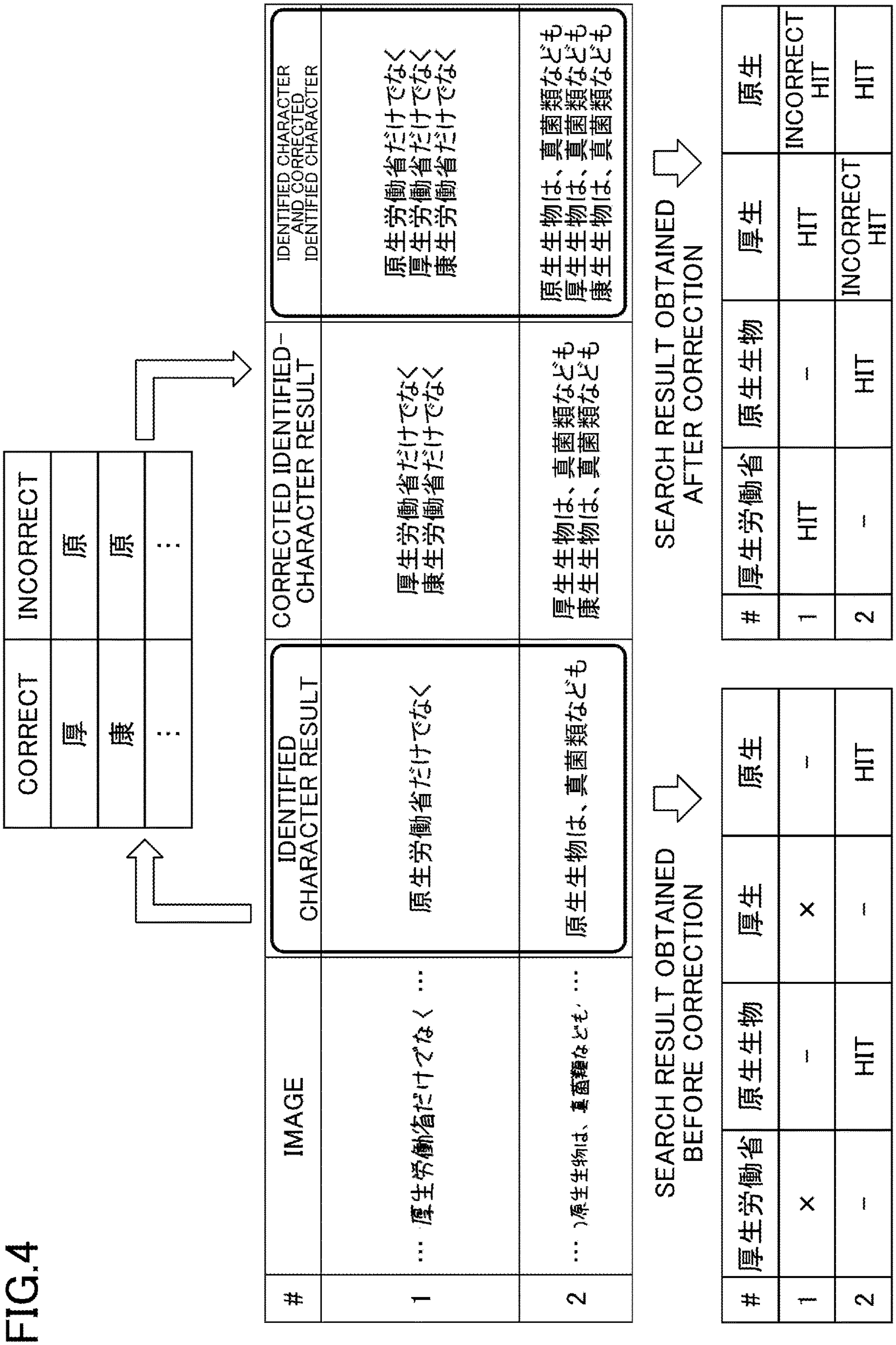
FIG. 4 is a diagram for describing a document search (first embodiment) according to one embodiment of the present invention.

FIG. 4 is a diagram for describing the document search (first embodiment) according to one embodiment of the present invention. The first embodiment provides a case where a character string associated with the "correct identification" and a character string associated with the "misidentification", which are stored in the misidentification table 202, are a pair of character strings each of which consists of one character. In FIG. 4, each of #1 and #2 relates to data (in a case of the document search in which one document is retrieved) of the character string that is included in one document.

In an example in FIG. 4, one "misidentification" is "原" and a corresponding "correct identification" is "厚", and the other "misidentification" is "原" and a corresponding "correct identification" is "康." In addition, for the "identified character result", #1 indicates "原生労働省だけでなく", and #2 indicates "原生生物は、真菌類なども." In this case, for the "corrected identified character result ("correction candidate" in the document information table 201 in FIG. 3)", #1 indicates "厚生労働省だけでなく" and "康生労働省だけでなく", and #2 indicates "厚生生物は、真菌類なども" and "康生生物は、真菌類なども." The search character string in #1 is "厚生労働省" and "厚生", and the search character string in #2 is "原 生生物" and "原生."

In #1, when a search target relates to only an identified character result, search character strings of "厚生労働省" and "厚生" cannot be extracted from the document, as illustrated in the "search result obtained before correction" in the bottom left of FIG. 4 (x). As in the present invention, when a search target relates to both an identified character result and a corrected identified character result, the search strings of "厚生労働省" and "厚生" can be extracted from the document, as illustrated in the "search result obtained after correction" in the bottom right of FIG. 4 (HIT) . However, in the first embodiment, when "原生" is entered as a search character string, "原生労働省だけでなく" is extracted (incorrect HIT).

When the search target relates to both the identified character result and the corrected identified character result, in a case where the search result display 105 displays a document image having a predetermined area, the displayed document image includes an area where the "identified character result" is present.

In #2, when the search target relates to only the identified character result, search character strings of "原生生物" and "原生" can be extracted from the document, as illustrated in the "search result obtained before correction" in the bottom left of FIG. 4 (HIT). As in the present invention, when the search target relates to both the identified character result and the corrected identified character result, the search character strings of "原生生物" and "厚生" can be extracted from the document, as illustrated in the "search result obtained after correction" in the bottom right of FIG. 4 (HIT). However, in the first embodiment, when "厚生" is entered as a search character string, "厚生生物は、真菌類なども" is extracted (incorrect HIT).

When the search target relates to both the identified character result and the corrected identified character result, in a case where the search result display 105 displays a document image having a predetermined area, the displayed document image includes an area where the "identified character result" is present.

As described above, in the first embodiment, both a document and a character string, which is obtained by changing a misidentified character string in the document to a correctly identified character string, are searched. With this arrangement, a situation arises where a character string that could have been extracted provided that characters therein were not replaced based on the errata cannot get extracted could not be extracted can be avoided.

<Second Embodiment>

FIG. 5 is a diagram for describing the document search (second embodiment) according to one embodiment of the present invention. The second embodiment provides a case where a character string associated with the "correct identification" and a character string associated with the "misidentification", which are stored in the misidentification table 202, are a pair of character strings each of which consists of a plurality of characters. Specifically, the character string of the "correct identification" and the character string of the "misidentification" are not indicated in a unit of the character, unlike in the first embodiment, and are indicated in a unit of a word (morpheme) that has its own meaning. In FIG. 5, each of #1 and #2 indicates data (in a case of the document search in which one document is retrieved) of the character string that is included in one document.

In an example of FIG. 5, one "misidentification" is "原生労働省" and a corresponding "correct identification" is "厚生労働省", and the other "misidentification" is "健原" and a corresponding "correct identification" is "健康." In addition, for the "identified character result", #1 indicates "原生労 働省だけでなく", and #2 indicates "原生生物は、真菌類なども." In this case, for the "corrected identified character result ("correction candidate" in the document information table 201 in FIG. 3)", #1 indicates "厚生労 働省だけでなく", and #2 does not indicates any corrected identified character result. The search character string in #1 is "厚生労働省" and "厚生", and the search character string in #2 is "原生生物" and "原生."

In #1, when the search target relates to only the identified character result, search character strings of "厚生労働省" and "厚生" cannot be extracted from the document, as illustrated in the "search result obtained before correction" in the bottom left of FIG. 5 (x). As in the present invention, when the search target relates to both the identified character result and the corrected identified character result, the search character strings of "厚 生労働省" and "厚生" can be extracted from the document, as illustrated in the "search result obtained in this technique" in the lower right of FIG. 5 (HIT). However, in the second embodiment, when "原生" is entered as a search character string, "原生労働省だけでなく" is extracted (incorrect HIT).

When the search target relates to both the identified character result and the corrected identified character result, in a case where the search result display 105 displays a document image having a predetermined area, the displayed document image includes an image that a user desires.

In #2, when the search target relates to only the identified character result, search character strings of "原生生物" and "厚生" can be extracted from the document, as illustrated in the "search result obtained before correction" in the bottom left of FIG. 5 (HIT). As in the present invention, when the search target relates to both the identified character result and the corrected identified character result, the search character strings of "原 生生物" and "原生" can be extracted from the document, as illustrated in the "search result in this technique" in the bottom right of FIG. 5 (HIT).

When the search target relates to both the identified character result and the corrected identified result, in a case where the search result display 105 displays a document image having a predetermined range, the displayed document image includes only an image that the user desires.

As described above, in the second embodiment, even when "厚生" is entered, any corrected identified character result, such as "厚生生物は、真菌類なども", does not exist erroneously. Thus, search noise can be reduced.

FIG. 6 is a diagram for describing an example of a method for creating the misidentification table 202 according to one embodiment of the present invention. Description will be provided in order of (1), (2), (3), and (4) below. The source character string is a character string that is present in a handwritten document, and an OCR character string is a character string that is extracted through OCR processing that is performed with respect to an image of the handwritten document.

First, in (1), a difference portion between the source character string and the OCR character string is extracted using an existing algorithm such as a shortest edit script (SES). At the difference portion obtained in the OCR character string, a misidentified character is identified.

Then, in (2), morphological analysis is performed to divide the source character string into morphemes.

Then, in (3), each morpheme obtained through the division in (2) above is associated with a corresponding misidentified character extracted in (1) above.

Then, in (4), a pair of a "correct identification" and a "misidentification" is generated based on the association in (3) above. Specifically, the morpheme (for example, "医学") is set as the "correct identification." In addition, characters (for example, "医会"), which are obtained by replacing, with the misidentified character (for example, "会"), a character (for example, "学") that corresponds to the misidentified character (for example, "会") that is included in the morpheme (for example, "医学"), are set as the "misidentification."

As described above, in the second embodiment, a situation in which a character string, which is supposed to be extracted unless the characters are replaced based on the erratum, could not be extracted can be avoided. Further, by dividing each of a misidentified character string into morphemes, each of which consists of characters, search noise can be reduced in a case where a source character-string candidate is created using a formed misidentification table.

The first embodiment and the second embodiment may be combined with each other. Specifically, both data of a pair of the "correct identification" and the "misidentification", each of which consists of one character, and data of a pair of the "correct identification" and the "misidentification", each of which consists of characters (for example, a morpheme), may be stored in the misidentification table 202. For example, among character strings that are obtained by making changes based on the pair of the "correct identification" and the "misidentification" each of which consists of characters, a character string of the "correct identification" that consists of a plurality of characters (for example, a morpheme) may be adopted as a search target.

<Third Embodiment>

FIG. 7 is a diagram for describing the document search (third embodiment) according to one embodiment of the present invention. In the third embodiment, the document searcher 103 can exclude, from a search target, an identified character result and a corrected identified character result each of which has a low degree of confidence, or can reduce a score that is given to the search result. The third embodiment may be combined with the first embodiment, may be combined with the second embodiment, or may be combined with a combination of the first embodiment and the second embodiment. In FIG. 7, each of #1 and #2 indicates data (in a case of the document search in which one document retrieved) of a character string that is included in one document.

In an example in FIG. 7, one "misidentification" is "厚生労働省" and a corresponding "correct identification" is "厚生労働省", and the other "misidentification" is "原" and a corresponding "correct identification" is "康." In addition, for the "identified character result" and a corresponding degree of confidence, #1 indicates "原生労働省だけでなく (a degree of confidence for the identified character: 0.5)", and #2 indicates "厚生生物は、真菌類なども (a degree of confidence for the identified character: 0.9)." In this case, for the "corrected identified character result ("correction candidate" in the document information table 201 in FIG. 3) and a corresponding degree of confidence for the correction", #1 indicates "厚生労働省だけでなく (a degree of confidence for the correction: 0.8)" and "康生労働省だけでなく (a degree of confidence for the correction: 0.3)", and #2 indicates "康生生物は、真菌類なども (a degree of confidence for the correction: 0.6)." The search character string in #1 is "厚生労働省" and "厚生", and the search character string in #2 is "原生生物" and "原生."

In #1, when the search target relates to only the identified character result, search character strings of "厚生労働省" and "厚生" cannot be extracted from the document, as illustrated in the "search result obtained before correction" in the bottom left of FIG. 7 (x). As in the present invention, for both the identified character result and the corrected identified character result, when a given identified character result and a given corrected identified character result, each of which has a low degree of confidence, are excluded from a search target, the search character strings of "厚生労働省" and "厚生" can be extracted from the document, as illustrated in the "search result in this technique" in the bottom right of FIG. 7 (HIT). However, in the third embodiment, when "厚生" is entered as a search character string, a character string having a low degree of confidence, such as "原生労働省だけでなく", is not searched. Thus, search noise can be reduced.

For both the identified character result and the corrected identified character result that are related with a search target, when an identified character result and a corrected identified character result, each of which has a low degree of confidence, are excluded, in a case where the search result display 105 displays a document image having a predetermined area, the displayed document image includes an image that the user desires.

In #2, when the search target relates to only the identified character result, search character strings of "原生生物" and "厚生" can be extracted from the document, as illustrated in the "search result obtained before correction" in the bottom left of FIG. 7 (HIT). As in the present invention, for both the identified character result and the corrected identified character result that are related with a search target, when an identified character result and a corrected identified character result, each of which has a low degree of confidence, are excluded, the search character strings of "原生生物" and "厚生" can be extracted from the document, as illustrated in the "search result in this technique" in the bottom right of FIG. 7 (HIT).

For both the identified character result and the corrected identified character result that are related with the search target, when the identified character result and the corrected identified character result, which has the low degree of confidence, are excluded, in a case where the search result display 105 displays a document image having a predetermined area, the displayed document image includes an image that the user desires.

FIG. 8 is a diagram illustrating an example of a relative degree of confidence according to one embodiment of the present invention. An approach to calculate the degree of confidence as illustrated in FIG. 8 utilizes the fact that an unnatural sentence with a string of characters, which does not convey any meaning in Japanese, is divided into multiple morphemes. This is described below in detail.

For example, as an OCR character string (identified character result), a character string of "日本の指事業法にあっては塩化ナトリウムの含有量が 1 0 0 分の4以上の回形物" is used. The OCR character string is a character string that is extracted through OCR processing that is performed with respect to an image of a handwritten document. In addition, one "misidentification" is "指事業法" and a corresponding "correct identification" is "塩事業法", and the other "misidentification" is "回形物" and a corresponding "correct identification" is "固形 物." Also, a given "misidentification" is "10" and a corresponding "correct identification" is "10g." In FIG. 8, each of #1 to #3 indicate a pair of correct and incorrect characters that are stored in the misidentification table.

In such a case, in an example in FIG. 8, for the OCR character string, when a correction candidate is generated by using any one of #1 to #3 that indicate respective pairs of correct and incorrect characters, correction candidates are as follows. "(1) 日本の塩事業法 にあっては塩化ナトリウムの含有量が 1 0 0 分の4以上の回形物", "(2) 日本の指事業法にあって は塩化ナトリウムの 含有量が 1 0 0 分の4以上の回形物", and "(3) は塩化ナトリウムのては塩化ナトリウ ムの含有量が 1 0 g 0 分の4以上の 回形物."

Then, morphological analysis is performed for (0), (1), (2), and (3) above. By the morphological analysis, a string of characters that fails to have a Japanese meaning is divided into an increased number of morphemes. Specifically, the followings are assumed. For (0), morphological analysis is performed to obtain 22 morphemes through division; for (1), morphological analysis is performed to obtain 21 morphemes through division; for (2), morphological analysis is performed to obtain 21 morphemes through division; and for (3), morphological analysis is performed to obtain 23 morphemes through division. In the approach to calculate the degree of confidence in FIG. 8, in accordance with an increasing number of morphemes for each of the OCR character string (identified character result) and the correction candidate, a corresponding degree of confidence for a corresponding character string among the OCR character string (identified character result) and the correction candidate can be decreased.

A given degree of confidence may be calculated with an approach (for example, an approach to perform natural language analysis or the like) other than the approach to perform morphological analysis as illustrated in FIG. 8. The given degree of confidence may be calculated in units of lines in a given document, in units of sentences, or in units of paragraphs.

In a case where character string information is acquired from a document image, an approach to use a character image similarity can be used as an approach to calculate a degree of confidence for each character.

In a case where a degree of confidence is calculated for each sentence, an approach to calculate the degree of confidence includes an approach to analyze a part-of-speech order to focus on the order of parts-of-speech, such as a case where, when a noun and a verb are placed in this order, the order is natural.

As described above, in the third embodiment, a situation in which a character string, which is supposed to be extracted unless the characters are replaced based on the erratum, could not be extracted can be avoided. Also, by excluding a given character string having a low degree of confidence or by lowering a priority for the given character string, search noise can be reduced. Further, in the third embodiment, a document is corrected for each character or each word (morpheme), and then an extent to which the correction is accurate is determined for each line, for each sentence, and for each paragraph, in the document. Thus, it can be determined whether one or more corrections are appropriate for each line, for each sentence, and for each paragraph, in the document.

<Verification for Search Accuracy>

FIG. 9 is a diagram for describing accuracy verification according to one embodiment of the present invention. The following four accuracy verifications were performed: "accuracy verification #1 (source document)", "accuracy verification #2 (OCR data)", "accuracy verification #3 (OCR data obtained after corrections of misidentifications (holding multiple candidates)", and "accuracy verification #4 (OCR data obtained after corrections of misidentifications (holding multiple candidates and holding degrees of confidence))".

In a specific procedure, first, a text illustrated in the top left of FIG. 9 was used as a source text, and an intricate handwritten font was used to create, based on the source text, a document image (as illustrated in the top center of FIG. 9) that had a handwriting style with handwritten characters. Here, as the source text (source document) for the accuracy verification #1, character information associated with the item of "塩" (Website in Japanese) that approximately involves 13000 characters on a multilingual Internet encyclopedia site, Wikipedia (registered trademark), was used.

Then, character string information was extracted from the document image, using an OCR processing tool, and OCR data of an OCR text, as illustrated in the top right of FIG. 9, was obtained. The character string information, which is included in the OCR text, includes one or more misidentifications as identified character results.

In the above method for creating the misidentification table, a given misidentification table was formed based on the source text and the OCR text as illustrated in the bottom left of FIG. 9. With regard to the item "塩", pairs of correct and incorrect characters, whose number is about 900, were created.

The accuracy verification #1 is a verification of accuracy in performing the search for the source document.

In the accuracy verification #2, for one or more search character strings, OCR data that included misidentifications were searched without using the misidentification table. The accuracy verification #2 will be described below with reference to FIG. 10.

In the accuracy verification #3, for search character strings, both a document and character strings, which were each obtained by changing, to a corresponding correct identified character string, a given misidentified character string that was included in the document, were searched. That is, OCR correction-candidate holding data, which included both the OCR data and multiple source character-string candidates, which were each obtained by changing, to a corresponding correct identified character string, a given misidentified character string that was included in the OCR data, were searched. The accuracy verification #3 will be described below with reference to FIG. 11.

In the accuracy verification #4, an identified character result and a corrected identified character result, each of which has a low degree of confidence, are excluded from a given search target. The accuracy verification #4 is described with reference to FIG. 12, as follows.

In each of the accuracy verifications #1 to #4, "Precision", "Recall", and "F1 measure" were calculated.

The "Precision (also referred to as precision or accuracy)" is a value that is obtained by dividing the number of correct character strings of hits in the search, by a total number of character strings of hits in the search. The precision can be regarded as an indication for accuracy of the search. As the "Precision" is increased, search noise is decreased. The precision is calculated by Precision=TP/(TP+FP) (TP: true positive, FP: false positive).

The "Recall (also referred to as recall or sensitivity)" is a value that is determined by dividing the number of correct character strings of hits in the search, by a total number of correct character strings. The recall can be regarded as an indication of search coverage. As the "Recall" is increased, an increased number of correct character strings are acquired. The recall is calculated by Recall=TP/(TP+FN) (TP: true positive, FN: false negative).

The "F1 measure" is a value that is calculated by a harmonic mean of the "Precision" and the "Recall", and the F1 measure can be regarded as an indication for a balance between accuracy and coverage of the search. The F1 measure is calculated by 2·Recall·Precision/(Recall+Precision).

FIG. 10 is a diagram for describing the accuracy verification (accuracy verification #2) according to one embodiment of the present invention. In the accuracy verification #2, "correct data" (that is, data of the source document) as illustrated in the top left of FIG. 10 was verified with "OCR data" (that is, data of the OCR document) as illustrated at the top right of FIG. 10. The procedure for verifying the accuracy is specifically described as follows. For each of words (e.g., "塩化ナトリウム", "岩塩", and the like), when the word was present in the first line of the correct data and in the first line of the OCR data, the word was counted as TP. Also, when the word was not present in the first line of the correct data, and present in the first line of the OCR data, the word was counted as FN. In addition, when the word was not present in the first line of the correct data and present in the first line of the OCR document, the word was counted as FP. Likewise, the procedures were repeated in the second line, . . . , Nth line. As a result, the "Precision", "Recall", and "F1 measure" were calculated. In such a manner, in the accuracy verification #2, it can be seen an extent to which search accuracy is reduced for a given identified character result in which OCR processing is performed.

Figure 11:
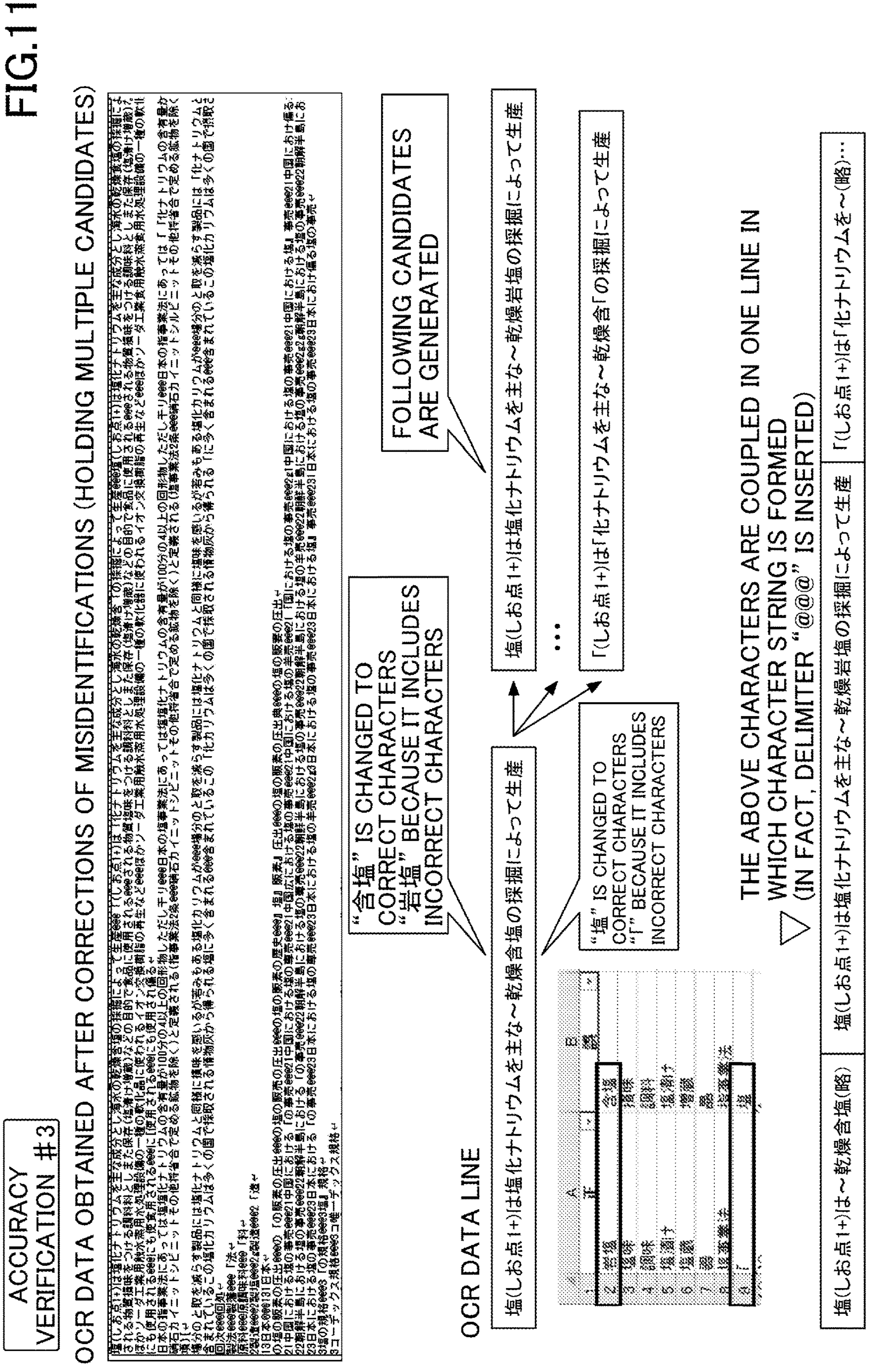
FIG. 11 is a diagram for describing the accuracy verification according to one embodiment of the present invention.

FIG. 11 is a diagram for describing the accuracy verification (accuracy verification #3) according to one embodiment of the present invention. In the accuracy verification #3, "correct data" (that is, data of the source document) was verified with "OCR data obtained after corrections of misidentifications (holding multiple candidates" as illustrated in the top part of FIG. 11. Specifically, a method for creating the OCR data obtained after corrections of misidentifications (holding multiple candidates) is described as follows. For each line of the OCR data (that is, data of the OCR document), one or more correction candidates are generated using the misidentification table (in an example in FIG. 11, a case or the like where "含塩" is changed to "岩塩" and a case where "塩" is changed to "「"). Then, the OCR data and the generated correction candidate are coupled in one line in which a delimiter ("@@@" in the example in FIG. 11) is placed between the OCR data and the correction candidate. The procedure for the accuracy verification is the same as that for the accuracy verification #2, and accordingly, the description thereof is omitted.

Figure 12:
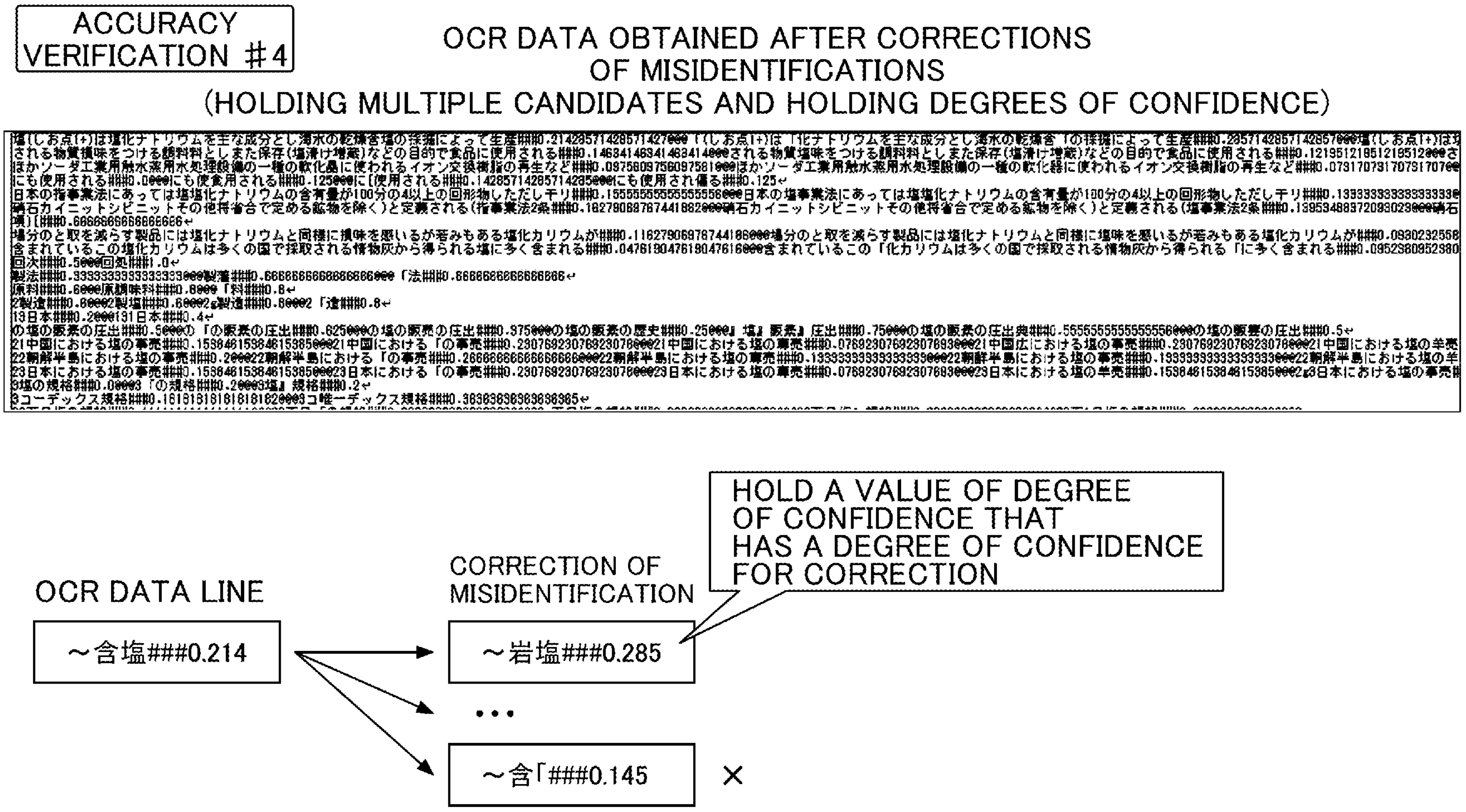
FIG. 12 is a diagram for describing the accuracy verification according to one embodiment of the present invention.

FIG. 12 is a diagram for describing the accuracy verification (accuracy verification #4) according to one embodiment of the present invention. In the accuracy verification #4, "correct data" (that is, data of the source document) was verified with "OCR data obtained after corrections of misidentifications (holding multiple candidates and holding degrees of confidence)" as illustrated in the top part of FIG. 12. Specifically, as in the accuracy verification #3, a method for creating the OCR data obtained after corrections of misidentifications (holding multiple candidates and holding degrees of confidence) is described as follows. For each line of the OCR data (that is, data of the OCR document), one or more correction candidates are generated using the misidentification table (in an example in FIG. 12, a case or the like where "含塩" is changed to "岩塩" and a case where "塩" is changed to "「"). Then, degrees of confidence are respectively given to the OCR data and the generated correction candidates. Subsequently, the OCR data and a corresponding generated correction candidate are coupled in one line in which a delimiter ("@@@" in the example in FIG. 12) is placed between the OCR data and the correction candidate. The procedure for the accuracy verification is the same as that for the accuracy verification #2, and accordingly, the description thereof is omitted (in the accurate verification #4, any data and candidate each having a low degree of confidence are excluded from a search target (x).

FIG. 13 is a diagram for comparing accuracy verifications according to one embodiment of the present invention. FIG. 13 illustrates the "Precision", "Recall", and "F1 measure" in the accuracy verification #1 ("#1 source document" in FIG. 9), the accuracy verification #2 ("#2 OCR data" in FIG. 10), the accuracy verification #3 ("#3 OCR data obtained after corrections of misidentifications (holding multiple candidates)" in FIG. 11), and the accuracy verification #4 ("#4 OCR data after corrections of misidentifications (holding multiple candidates and holding degrees of confidence" in FIG. 12). Among pieces of data stored in the misidentification table (in this example, for the item of "塩", pairs of correct and incorrect characters of about 900), 800 pairs were used (x) except for pairs in which the "misidentification" was one character. Each degree of confidence is calculated with an approach to perform morphological analysis as illustrated in FIG. 8.

As illustrated in FIG. 13, an F1 measure for "#3 OCR data obtained after corrections of misidentifications (holding multiple candidates)" according to each of the first embodiment and the second embodiment is greater than an F1 measure for "#2 OCR document." In addition, an F1 measure for "#4 OCR data obtained after corrections of misidentifications (holding multiple candidates and holding degrees of confidence)" according to the third embodiment is greater than the F1 measure for "#3 OCR data obtained after corrections of misidentifications (holding multiple candidates)."

<Processing Method>

Figure 14:
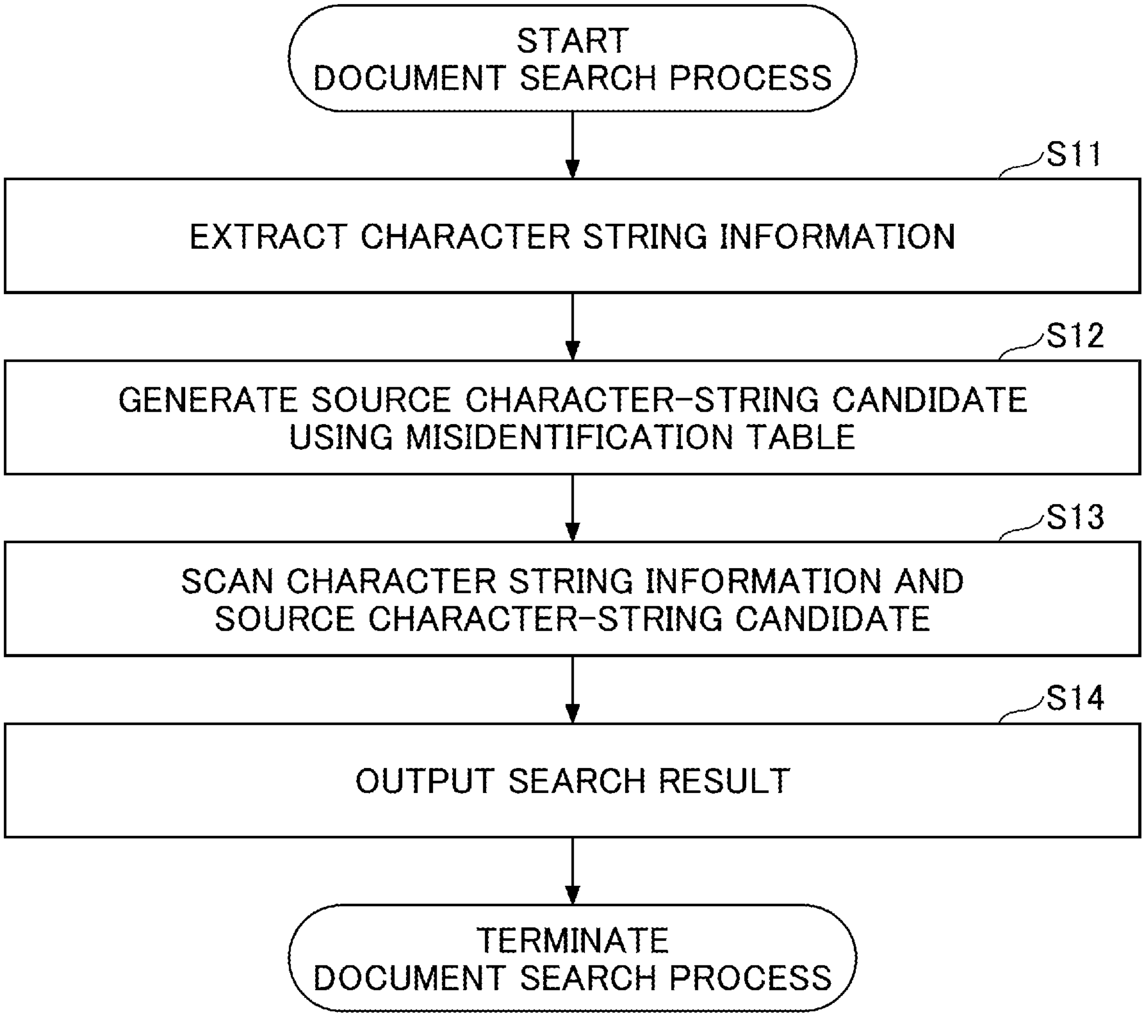
FIG. 14 is a flowchart illustrating a document search process flow according to one embodiment of the present invention.

FIG. 14 is a flowchart illustrating the flow of a document search process according to one embodiment of the present invention.

In step 11 (S11), the OCR processor 101 extracts character string information. Specifically, the OCR processor 101 acquires a document image (for example, an image of a handwritten document). Next, the OCR processor 101 performs an optical character recognition (OCR) process to extract character string information from the acquired document image. In a case of a document that is created using document creation software, the character string information in the document is used.

In step 12 (S12), the source character-string candidate generator 102 generates one or more source character-string candidates, by using the misidentification table 202. Specifically, the source character-string candidate generator 102 refers to character strings associated with the "correct identification" and "misidentification" that are in the misidentification table 202 to change, to a given character string associated with the "correct identification", a given character string, associated with the "misidentification", included in the character string information in S11, and then generates the source character string candidate.

In step 13 (S13), the document searcher 103 scans the character string information in S11, and scans the source character-string candidate generated in S12. Specifically, the document searcher 103 retrieves a search character string acquired from the user terminal 20, from the character string information in S11 and the source character-string candidate in S12.

In step 14 (S14), the search result display 105 included in the document searcher 103 outputs a search result (for example, a document ID of the document that includes the search character string, an image of the handwritten document corresponding to the document that includes the search character string, and the like) to the user terminal 20.

<Effect>

As described above, in the present invention, both a document and a character string that is obtained by changing a misidentified character string in the document to a correctly identified character string are retrieved. With this arrangement, a situation in which a character string, which is supposed to be extracted unless the characters are replaced based on the erratum, could not be extracted, can be avoided. Also, by dividing each of the misidentified character string and the correctly identified character string into morphemes, search noise can be reduced. In addition, by removing data having a low degree of confidence or lowering a corresponding priority, search noise can be reduced.

<Hardware Configuration>

Figure 15:
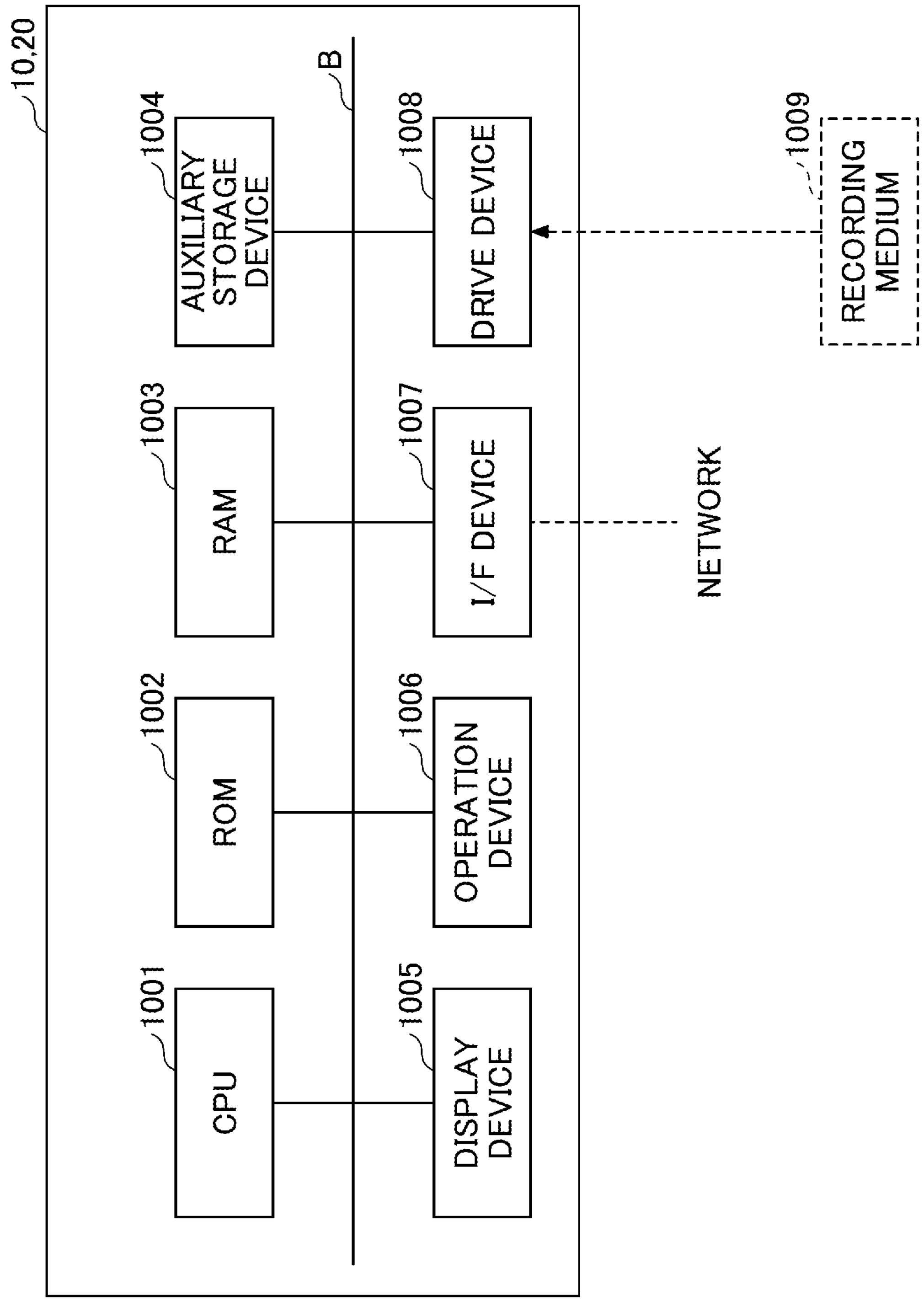
FIG. 15 is a diagram illustrating a hardware configuration of the document retrieval device and a user terminal according to one embodiment of the present invention.

FIG. 15 is a diagram illustrating a hardware configuration of the document retrieval device 10 and the user terminal 20 according to one embodiment of the present invention. Each of the document retrieval device 10 and the user terminal 20 includes a central processing unit (CPU) 1001, a read only memory (ROM) 1002, and a random access memory (RAM) 1003. The CFU 1001, the ROM 1002, and the RAM 1003 constitute what is known as a computer.

Each of the document retrieval device 10 and the user terminal 20 can include an auxiliary storage device 1004, a display device 1005, an operation device 1006, an interface (I/F) device 1007, and a drive device 1008.

Hardware components of each of the document retrieval device 10 and the user terminal 20 are connected together via a bus B.

The CPU 1001 is a computing device that executes various programs that are installed in the auxiliary storage device 1004.

The ROM 1002 is a non-volatile memory. The ROM 1002 serves as a main storage device that stores various programs, data, and the like that are necessary for the CPU 1001 to execute various programs installed in the auxiliary storage device 1004. Specifically, the ROM 1002 serves as the main storage device that stores a boot program or the like, such as a basic input and output system (BIOS) or an extensible firmware interface (EFI).

The RAM 1003 is a volatile memory such as a dynamic random access memory (DRAM) or a static random access memory (SRAM). The RAM 1003 serves as the main storage device that provides a work area where various programs installed in the auxiliary storage device 1004 are to be developed when the CPU 1001 executes the programs.

The auxiliary storage device 1004 is an auxiliary storage device that stores various programs and information that are used when the various programs are executed.

The display device 1005 is a display device that displays internal states and the like of the document retrieval device 10 and the user terminal 20.

The operation device 1006 is an input device through which a person, who operates each of the document retrieval device 10 and the user terminal 20, enters various instructions to a corresponding one among the document retrieval device 10 and the user terminal 20.

The I/F device 1007 is a communication device for coupling to a network and communicating with the other device.

The drive device 1008 is a device for setting a recording medium 1009. The recording medium 1009 includes a medium, such as a CD-ROM, a flexible disk, or a magneto-optical disk, that optically, electrically, or magnetically records information. The recording medium 1009 may include a semiconductor memory or the like that electrically records information, such as an erasable programmable read only memory (EPROM) or a flash memory.

The various programs installed in the auxiliary storage device 1004 are installed, for example, by setting a distributed recording medium 1009 in the drive device 1008 and by the drive device 1008 that reads out the various programs that are recorded in the recording medium 1009. Alternatively, the various programs installed in the auxiliary storage device 1004 may be installed by being downloaded from the network via the I/F device 1007.

Although the embodiments of the present invention are described above in detail, the present invention is not limited to specific embodiments described above, and various modifications and changes can be made within the scope of the spirit of the present invention set forth in the claims.

REFERENCE SIGNS LIST

1 document retrieval system
10 document retrieval device
20 user terminal
101 OCR processor
102 source character-string candidate generator
103 document searcher
104 storage
105 search result display
201 document information table
202 misidentification table
1001 CPU
1002 ROM
1003 RAM
1004 auxiliary storage device
1005 display device
1006 operation device
1007 I/F device
1008 drive device
1009 recording medium

The invention claimed is:

1. A document retrieval device comprising:
a misidentification table storing
a correctly identified character string that is presented as first text data by a user input, the first text data corresponding to individual handwritten characters, and
a misidentified character string that is second text data obtained by incorrectly recognizing the individual handwritten characters; and
a processor configured to
obtain a search character string, and
retrieve the search character string from both a document and a character string that is obtained by changing the misidentified character string included in the document to the correctly identified character string,
wherein the processor is configured to
compare a digitalized character string with a second character string, the digitalized character string being presented by a second user input, and corresponding to target handwritten text to be recognized using optical character recognition, and the second character string being obtained by recognizing the target handwritten text using the optical character recognition,
determine a difference between the digitalized character string and the second character string, based on a result of comparison, and
register, for each combination of content words, the correctly identified character string and the misidentified character string in association with characters of the digitalized character string and the second character string that are related to the difference, in the misidentification table.

2. The document retrieval device according to claim 1, wherein each of the correctly identified character string and the misidentified character string is a character string that consists of one character.

3. The document retrieval device according to claim 1, wherein each of the correctly identified character string and the misidentified character string is a morpheme that consists of a plurality of characters.

4. The document retrieval device according to claim 1, wherein respective misidentification tables, each of which includes a pair of the correctly identified character string and the misidentified character string, are set in situations including both a case where each of the correctly identified character string and the misidentified character string is a character string that consists of one character and a case where each of the correctly identified character string and the misidentified character string is a morpheme that consists of a plurality of characters.

5. The document retrieval device according to claim 1, further comprising a document information table that stores:
a degree of confidence for the character string that is obtained by changing the misidentified character string included in the document to the correctly identified character string, and
a degree of confidence for a character string that is used before changing the misidentified character string included in the document to the correctly identified character string,
wherein the processor is configured to exclude a corresponding character string having a low degree of confidence, from a search target.

6. The document retrieval device according to claim 1, further comprising a document information table that stores:
a degree of confidence for the character string that is obtained by changing the misidentified character string included in the document to the correctly identified character string, and
a degree of confidence for a character string that is used before changing the misidentified character string included in the document to the correctly identified character string,
wherein the processor is configured to lower a priority for a corresponding character string having a low degree of confidence.

7. The document retrieval device according to claim 1, further comprising display,
wherein the processor is configured to display a search result on the display.

8. A document retrieval system comprising:
a document retrieval device; and
a user terminal,
wherein the document retrieval device includes:
a misidentification table storing
a correctly identified character string that is presented as first text data by a user input, the first text data corresponding to individual handwritten characters, and
a misidentified character string that is second text data obtained by incorrectly recognizing the individual handwritten characters, and
a processor configured to obtain a search character string, and retrieve the search character string from both a document and a character string that is obtained by changing the misidentified character string included in the document to the correctly identified character string, and wherein the processor is configured to compare a digitalized character string with a second character string, the digitalized character string being presented by a second user input, and corresponding to target handwritten text to be recognized using optical character recognition, and the second character string being obtained by recognizing the target handwritten text using the optical character recognition, determine a difference between the digitalized character string and the second character string, based on a result of comparison, and register, for each combination of content words, the correctly identified character string and the misidentified character string in association with characters of the digitalized character string and the second character string that are related to the difference, in the misidentification table.

9. A non-transitory computer-readable recording medium storing a program that, when executed by a computer with a misidentification table causes the computer to execute a method, the misidentification table storing a correctly identified character string that is presented as first text data by a user input, the first text data corresponding to individual handwritten characters, and a misidentified character string that is second text data obtained by incorrectly recognizing the individual handwritten characters, and the method comprising:

obtaining a search character string; and retrieving the search character string from both a document and a character string that is obtained by changing the misidentified character string included in the document to the correctly identified character string, wherein the method further includes comparing a digitalized character string with a second character string, the digitalized character string being presented by a second user input, and corresponding to target handwritten text to be recognized using optical character recognition, and the second character string being obtained by recognizing the target handwritten text using the optical character recognition;

determining a difference between the digitalized character string and the second character string, based on a result of comparison; and registering, for each combination of content words, the correctly identified character string and the misidentified character string in association with characters of the digitalized character string and the second character string that are related to the difference, in the misidentification table.

10. A method executed by a document retrieval device with a misidentification table that stores a correctly identified character string that is presented as first text data by a user input, the first text data corresponding to individual handwritten characters, and a misidentified character string that is second text data obtained by incorrectly recognizing the individual handwritten characters, the method comprising:

obtaining a search character string; and retrieving the search character string from both a document and a character string that is obtained by changing the misidentified character string included in the document to the correctly identified character string, wherein the method further includes comparing a digitalized character string with a second character string, the digitalized character string being presented by a second user input, and corresponding to target handwritten text to be recognized using optical character recognition, and the second character string being obtained by recognizing the target handwritten text using the optical character recognition;

determining a difference between the digitalized character string and the second character string, based on a result of comparison; and registering, for each combination of content words, the correctly identified character string and the misidentified character string in association with characters of the digitalized character string and the second character string that are related to the difference, in the misidentification table.

* * * * *